(12) United States Patent
Chilinski

(10) Patent No.: US 10,837,483 B2
(45) Date of Patent: Nov. 17, 2020

(54) SELF-LOCKING THREADED ARTICLE WITH POLYGONAL HEAD AND RATCHET RING ASSEMBLY

(71) Applicant: General Electric Company, Schenectady, NY (US)

(72) Inventor: Marek Chilinski, Choroszcz (PL)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 16/011,200

(22) Filed: Jun. 18, 2018

(65) Prior Publication Data

US 2019/0003519 A1  Jan. 3, 2019

(30) Foreign Application Priority Data

Jun. 28, 2017  (EP) .................................... 17461561

(51) Int. Cl.
  *F16B 39/286* (2006.01)
  *F16B 39/32* (2006.01)
  *G02B 23/24* (2006.01)
(52) U.S. Cl.
  CPC ............ *F16B 39/286* (2013.01); *F16B 39/32* (2013.01); *G02B 23/2476* (2013.01)
(58) Field of Classification Search
  CPC .... F16B 39/286; F16B 39/32; Y10S 411/949; Y10S 411/95; Y10S 411/951; G02B 23/2476
  USPC ........................................ 411/326, 327, 329
  See application file for complete search history.

(56) References Cited

U.S. PATENT DOCUMENTS

| 3,275,055 A | * | 9/1966 | Gutshall | F16B 39/282 411/134 |
| 3,294,140 A | * | 12/1966 | Cosenza | F16B 5/0208 411/105 |
| 3,295,578 A | * | 1/1967 | Maloof | F16B 39/32 411/105 |
| 4,534,101 A | * | 8/1985 | Rosan, Jr. | F16B 39/10 29/258 |

(Continued)

OTHER PUBLICATIONS

Extended European Search Report and Opinion issued in connection with corresponding EP Application No. 17461561.7 dated Dec. 22, 2017.

*Primary Examiner* — Roberta S Delisle
(74) *Attorney, Agent, or Firm* — McGarry Bair PC

(57) ABSTRACT

A self-locking plug assembly includes ratchet ring circumscribing body having centerline and shank having a threaded top portion. Flexible fingers spiral away from periphery of ratchet ring to engage polygonal sides of polygonal sided ring attached to body. Hooks may extend radially outwardly and downwardly from periphery of ratchet ring. Spring around polygonal portion of body rests on ratchet ring. Annular retaining ring snapped into annular groove in body compresses spring. Hooks may engage notches in the upper wall. Alternatively, hooks may include paws extending inwardly from downwardly extending legs of hooks and into the pockets and engaging upper pocket walls to axially secure the ratchet ring. Body may be borescope plug with a lower end of shank conforming to lower port opening in upper wall. Alternatively, flexible fingers extend outwardly from radially outer rim of ratchet ring and engage polygonal sides of inner side of polygonal sided ring circumscribing ratchet ring.

29 Claims, 12 Drawing Sheets

(56) References Cited

U.S. PATENT DOCUMENTS

| | | | | |
|---|---|---|---|---|
| 5,460,468 | A | 10/1995 | DiStacio | |
| 6,976,816 | B2 * | 12/2005 | Slesinski | F16B 39/103 |
| | | | | 411/120 |
| 7,179,011 | B1 | 2/2007 | Cohen | |
| 8,403,611 | B2 * | 3/2013 | Friesen | F16B 39/32 |
| | | | | 411/197 |
| 9,636,763 | B2 * | 5/2017 | Hortling | B27B 5/32 |
| 9,841,046 | B2 * | 12/2017 | Hess | F16B 37/00 |
| 10,125,807 | B2 * | 11/2018 | Furu-Szekely | F16B 39/24 |
| 10,215,217 | B2 * | 2/2019 | Hess | A61B 17/7032 |
| 2016/0084291 | A1 | 3/2016 | Stewart | |
| 2016/0097412 | A1 * | 4/2016 | Bynum | F16B 2/10 |
| | | | | 403/327 |

* cited by examiner

SELF-LOCKING THREADED ARTICLE WITH POLYGONAL HEAD AND RATCHET RING ASSEMBLY

FIELD OF THE INVENTION

The present invention relates generally to self-locking threaded assemblies and, in particular, to self-locking threaded plugs, bolts, and other threaded articles.

BACKGROUND OF THE INVENTION

Self-locking threaded article assemblies are well known in many industries. Threaded articles such as plugs and nuts are used in aircraft turbofan gas turbine engines such as bolts and borescopes and other plugs. Many engines include double walled structures, such as a compressor, a combustor and the like, where the outer and inner walls are respectively provided with a number of borescope holes or ports. One purpose of the borescope ports is to allow inspection and monitoring of the engine. This may be accomplished by inserting inspection equipment, such as borescopes and/or probes, through the borescope ports.

Removable borescope plugs are used to seal the borescope ports between inspections to prevent the leakage of high pressure and high temperature gas through the borescope port. Typically, the borescope ports are threaded holes in the engine cases and the borescope plugs typically screws or threads into an outer port and seals both the outer and inner ports. The borescope plugs are required to incorporate a secondary locking feature to prevent them from loosening and/or falling out while the engine is operating. Many engine designs specify self-locking borescope plugs and many have been used in gas turbine engines.

It is desirable that the borescope plugs and bolts and other threaded elements used in engines have double anti-rotation protection. Assemblies with bolts and borescope plugs are often provided with self-locking threads, plug or bolt head fixing mechanism, ratchets, and pins.

It is desirable to provide bolts and borescope plugs used in engines with double self-locking protection that is simple to manufacture and use, highly reusable, robust in function, and not prone to damage. It is desirable to provide the anti-rotation feature that does not require special tools, techniques, or knowledge to operate. It is desirable to provide bolts and borescope plugs self-locking mechanisms with multi-use ability, minimum movable elements, simple construction, and easy maintainability and handling.

SUMMARY OF THE INVENTION

A self-locking plug assembly includes a body circumscribing a longitudinal centerline, a ratchet ring circumscribing the body, and a shank having at least a top portion of the shank threaded. The ratchet ring includes flexible fingers extending or spiraling away from a periphery of the ratchet ring towards and engaging polygonal sides of the body or of a multi-faceted or polygonal sided ring attached to the body.

One embodiment of the assembly further includes the flexible fingers extending or spiraling radially inwardly towards the centerline from a radially outer rim of the ratchet ring and the fingers engaging the polygonal sides of a multi-faceted or polygonal portion of the body. Hooks may extend radially outwardly and downwardly from the periphery of the ratchet ring and may engage notches in an upper wall to prevent rotation of the ratchet ring during threading in of the body.

A spring or a coil spring may be located over and around the polygonal portion and axially rest on and compress the ratchet ring, an annular retaining ring may be over and around the polygonal portion and axially rest on and compress the spring or coil spring, and the retaining ring may be snapped into and received in an annular groove in the body. The annular groove may be above the polygonal portion.

Paws may extend radially inwardly from downwardly extending legs of the hooks and into pockets extending radially inwardly toward the centerline and into an upper wall. The paws may engage upper pocket walls of the pockets to axially secure the ratchet ring and to prevent rotation of the ratchet ring during threading in of the body.

Alternatively, the flexible fingers may extend or spiral radially outwardly away from the centerline from a radially outer rim of the ratchet ring and engage the polygonal sides of a multi-faceted inner side of the polygonal sided ring circumscribing the ratchet ring. An anti-rotation means may be provided for preventing the ratchet ring from rotating about the body while threading the body into the threaded port or hole. A threaded port or hole in an outer casing may be reciprocally threaded with the threaded top portion of the shank and at least one pin extending outwardly and downwardly from a periphery of the polygonal sided ring engages notches or pin holes in the outer casing to restrain rotation of the polygonal sided ring during the threading.

A spring may be fitted over and around a top end of the plug and axially rests on the polygonal sided ring. An annular retaining ring is fitted over and around the top end of the self-locking plug and axially rests on and compresses the coil spring and the retaining ring is snapped into and received in an annular groove in the top end.

A self-locking plug assembly may include a borescope plug for sealing at least one of upper and lower borescope ports in upper and lower walls, respectively, a body of the borescope plug circumscribing a longitudinal centerline, a ratchet ring circumscribing the body, a shank of the body and at least a top portion of the shank being threaded, and the ratchet ring including flexible fingers extending or spiraling away from a periphery of the ratchet ring towards and engaging polygonal sides of the body or of a multi-faceted or polygonal sided ring attached to the body.

The assembly may further include the flexible fingers extending or spiraling radially inwardly towards the centerline from a radially outer rim of the ratchet ring, the fingers engaging the polygonal sides of a multi-faceted or polygonal portion of the body, upper and lower port openings in the upper and lower borescope ports, respectively, and the threaded top portion of the shank and one of the upper and lower port openings being reciprocally threaded.

Another embodiment of a self-locking plug assembly may include a borescope plug for sealing upper and lower borescope ports in upper and lower walls, respectively, a body circumscribing a longitudinal centerline, a ratchet ring circumscribing the body, the body including a shank with at least a top portion of the shank being threaded. The plug assembly further includes the threaded top portion of the shank reciprocally threaded with an upper port opening of the upper borescope port, a lower end of the shank sealingly engaged with a lower port opening of the lower borescope port, the ratchet ring including flexible fingers extending or spiraling radially inwardly towards the centerline from a radially outer rim of the ratchet ring, and the fingers engaging polygonal sides of a multi-faceted or polygonal portion of the body. The lower end may be conformally shaped to the lower port opening. The lower end and the lower port opening may be conically shaped.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
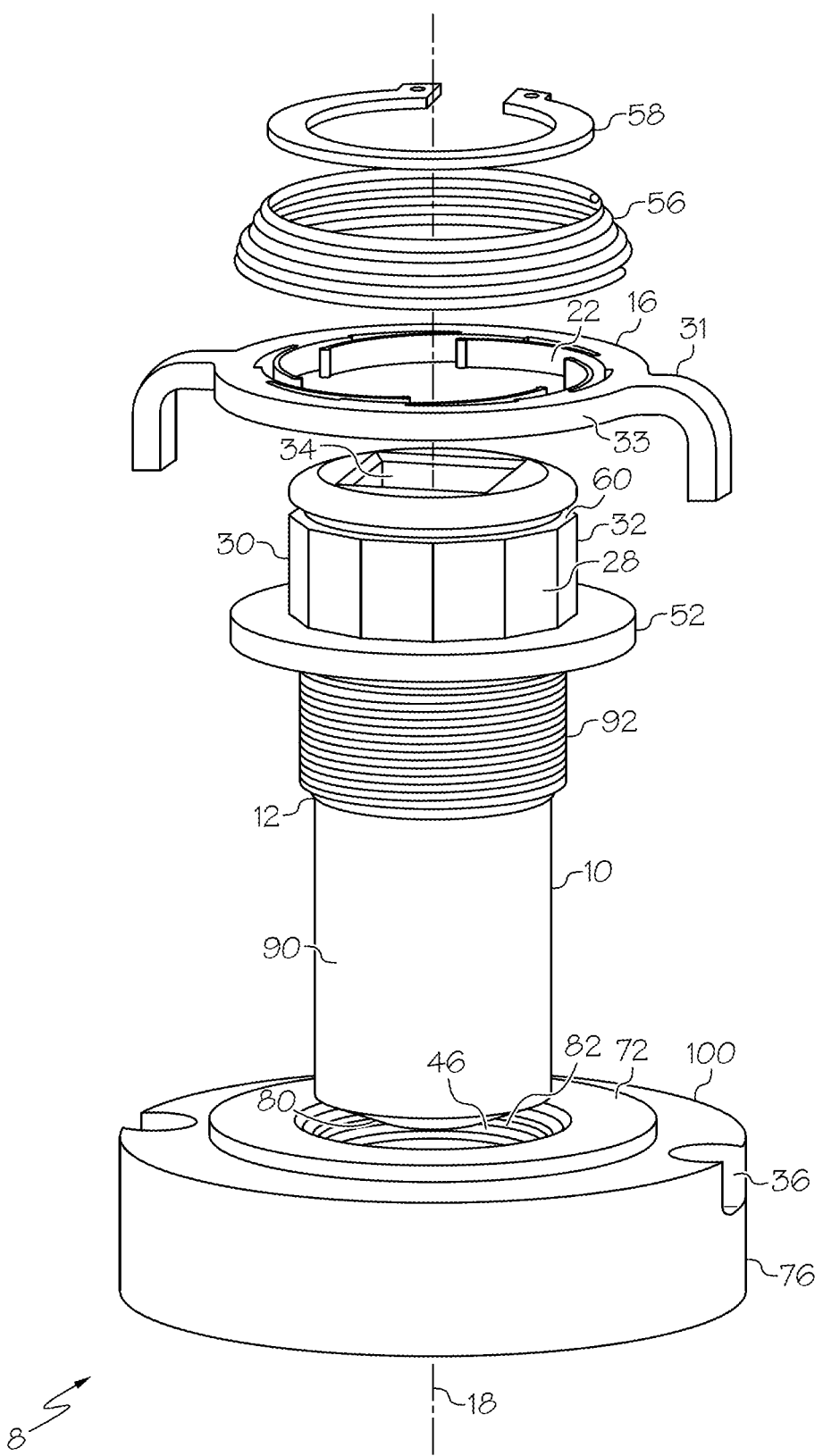
FIG. 1 is an exploded diagrammatical perspective view illustration of an exemplary embodiment of a self-locking plug assembly with elastic fingers engaging polygonal sides attached to a body of the assembly.
Figure 2:
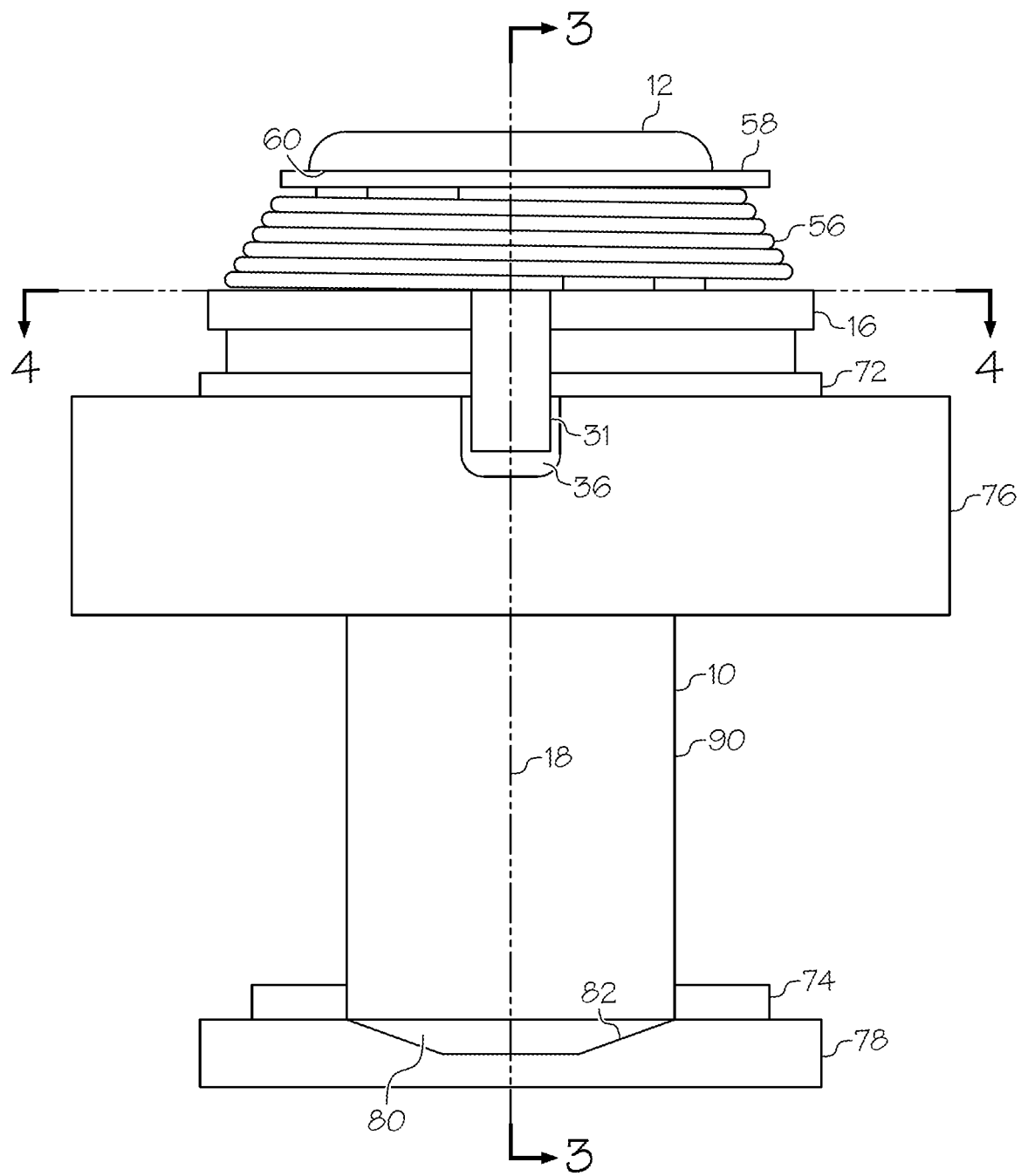
FIG. 2 is a side view illustration of the assembly illustrated in FIG. 1.
Figure 3:
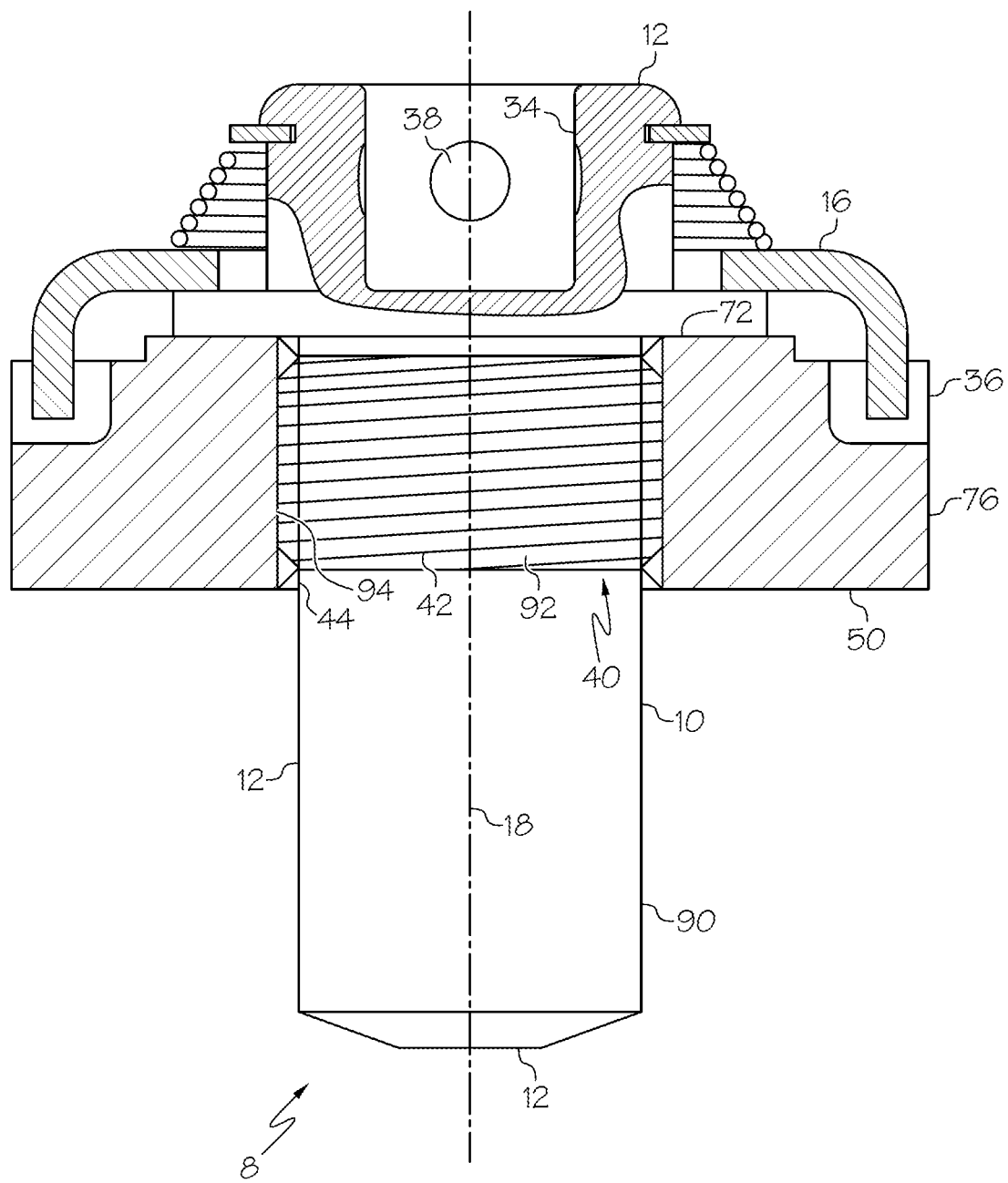
FIG. 3 is a cross-sectional diagrammatical view illustration of the assembly through 3-3 in FIG. 2.
Figure 4:
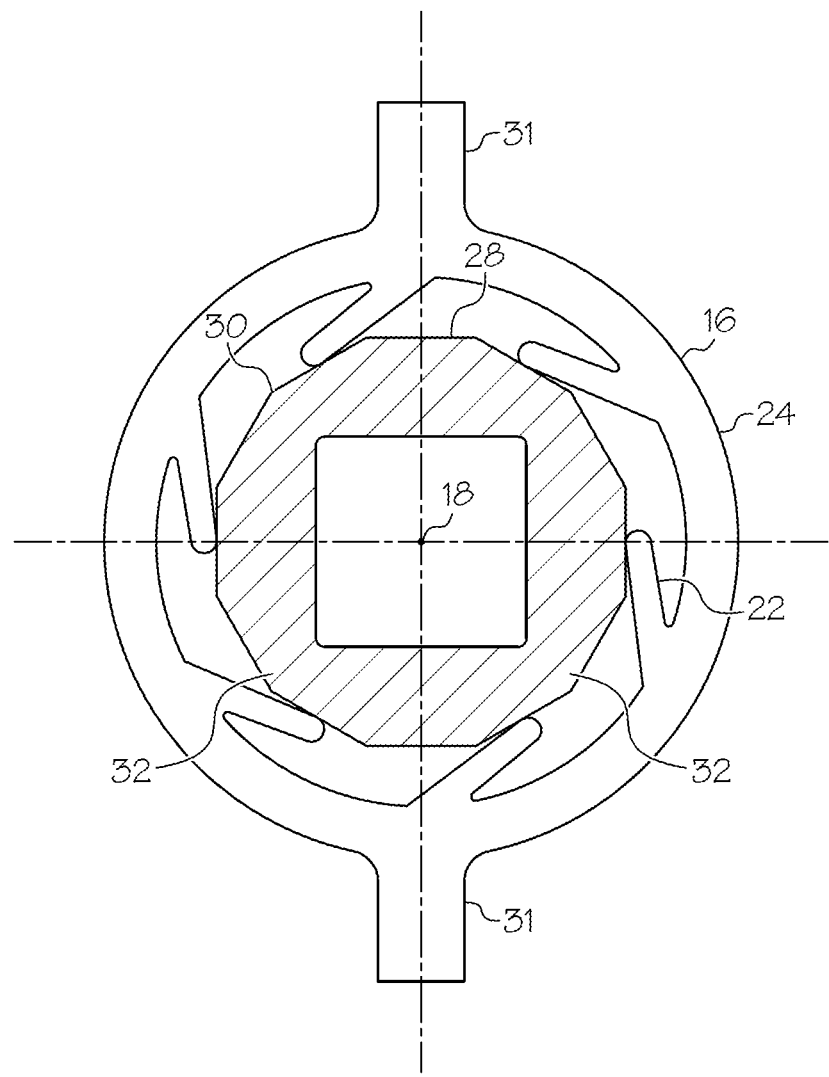
FIG. 4 is a cross-sectional diagrammatical view illustration of the assembly through 4-4 in FIG. 2.

Illustrated in FIGS. 1-3 is an exemplary embodiment of a self-locking plug assembly 8 including a plug 10 for use with a borescope port 100, such as the type used in jet aircraft engine casings or other types of gas turbine engine casings. However, it will be appreciated that the assembly 8 is not limited by the intended use as a borescope plug, and that such an assembly may be used in other applications, such as a drain plug, an access plug, a chip detector, a pipe connection, fluid system, and other similar threaded parts including bolts. The borescope plug 10 illustrated herein is used to seal upper and lower borescope ports 72, 74 in upper and lower walls 76, 78, respectively.

Figure 5:
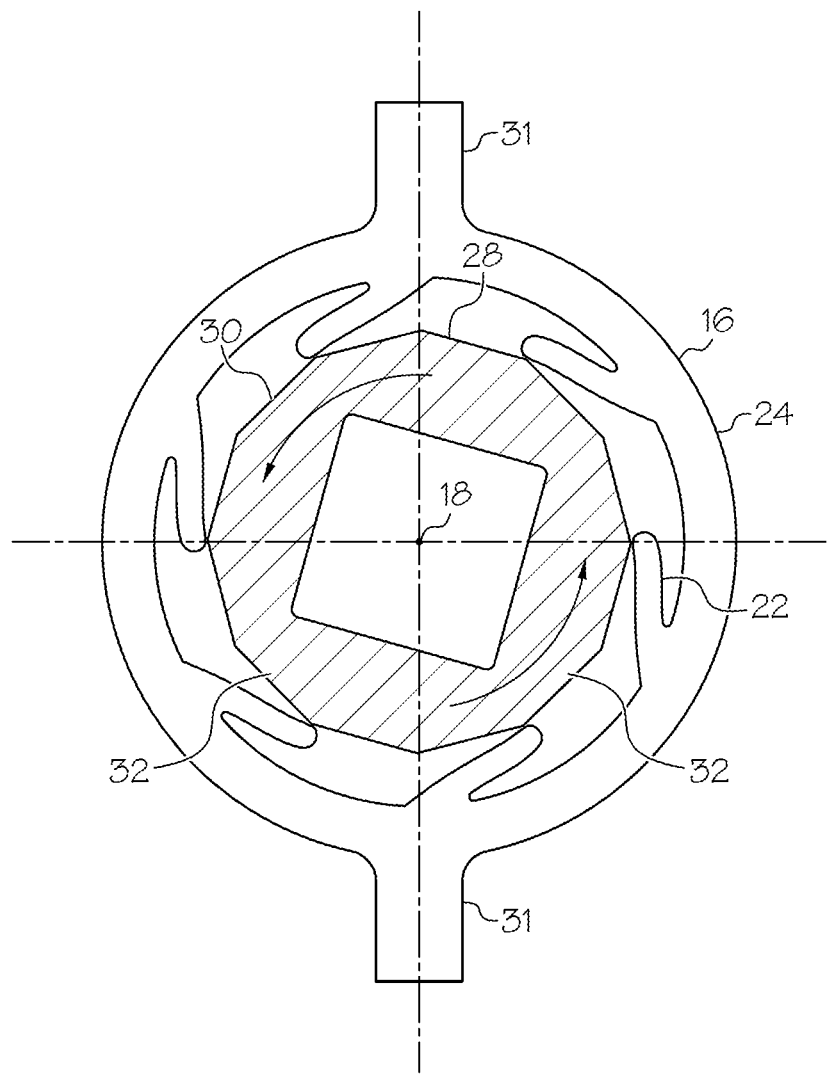
FIG. 5 is a diagrammatical cross-sectional view illustration of the polygonal head rotated with respect to the elastic fingers illustrated in FIG. 4.
Figure 6:
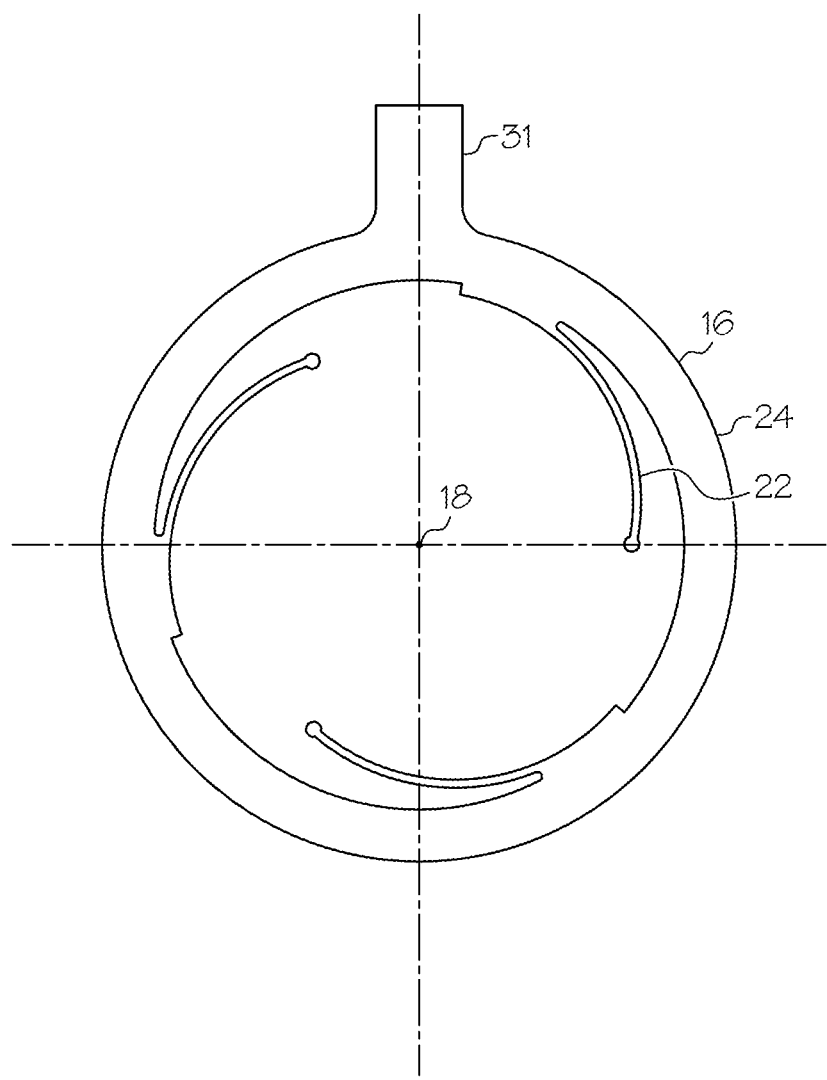
FIG. 6 is a top looking down view illustration of an embodiment of the ratchet ring illustrated in FIG. 1 with three fingers.
Figure 7:
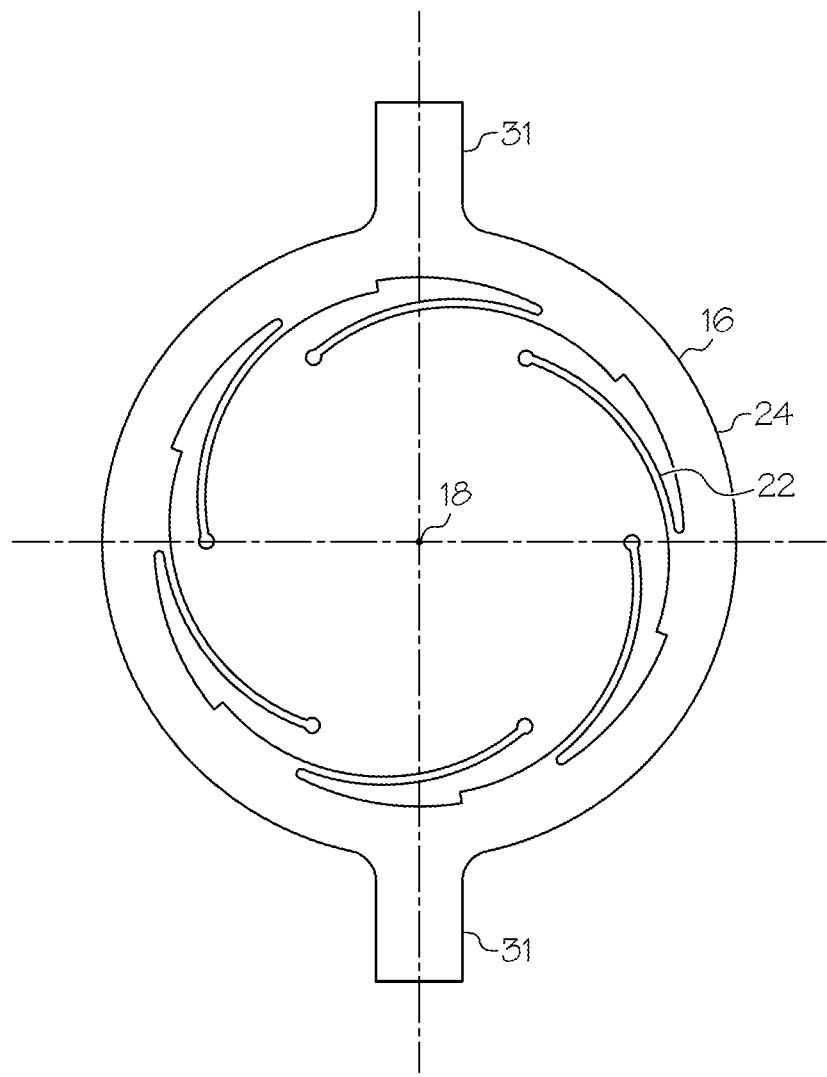
FIG. 7 is a top looking down view illustration of an embodiment of the ratchet ring illustrated in FIG. 1 with five fingers.

Referring to FIGS. 1-4, the assembly 8 includes the self-locking plug 10, or other threaded article. A body 12 of the plug 10 is a body or revolution circumscribed about a longitudinal centerline 18. The assembly 8 further includes a ratchet ring 16 circumscribed about the centerline 18 and the body 12 of the self-locking plug 10, or other threaded article. The ratchet ring 16 is mounted to the upper borescope port 72 or upper wall 76. The ratchet ring 16 includes flexible fingers 22 extending or spiraling radially inwardly towards the centerline 18 from a radially outer rim 24 of the ratchet ring 16. The fingers 22 engage polygonal sides 28 of a multi-faceted or polygonal sided ring 29 which may be a portion 30 of the body 12 such as a hex head 32 illustrated in FIG. 4 during ratcheting illustrated in FIG. 5. The ratchet ring 16 may be made from sheet metal. The ratchet ring 16 may be designed with different numbers of fingers 22, three fingers 22 are illustrated in FIG. 6 and five fingers 22 are illustrated in FIG. 7. Hooks 31 extend outwardly and downwardly from a periphery 33 of the ratchet ring 16 to engage notches 36 in the upper wall 76 to prevent rotation of the ratchet ring 16 during threading in of the plug 10 and ratcheting.

A lower end 80 of the body 12 of the plug 10 is sealingly engaged with and may be conformally shaped to a lower port opening 82 of the lower borescope port 74 as illustrated in FIG. 3. The lower end 80 and the lower port opening 82 may be conformal and may be conically shaped as illustrated herein. A shank 90 of the body 12 extends down from a washer or flange 52 around the body 12 and a top portion 92 of the shank 90 is externally threaded. The externally threaded top portion 92 is suitable to be threaded into an internally threaded upper port opening 94 of the upper borescope port 72 as illustrated in FIG. 1. Alternatively, the top portion 92 of the shank 90 may be internally threaded and the upper port opening 94 may be externally threaded. Thus, the top portion 92 of the shank 90 and the upper port opening 94 are reciprocally threaded. The lower end 80 of the body 12 may also be the lower end 80 of the shank 90.

Referring to FIG. 3, the exemplary embodiment of the polygonal portion 30 illustrated herein is the hex head 32 on the self-locking plug 10. The hex head 32 includes a drive element illustrated herein as a square recess 34 for receiving a square drive as may be found in a wrench socket set. Examples of other suitable drive elements include Allen socket, splined socket, an external hex, and the like. A dimple 38 is disposed in an inner surface inside of the square recess 34. The dimple 38 is used to secure the square drive socket. The body 12 includes a threaded portion 40 including inner threads 42 operable to be threaded into outer threads 44 in port or hole 46 in an outer casing 50. A washer or flange 52 is disposed between the polygonal portion 30 or the hex head 32 and the threaded portion 40 of the body 12.

The ratchet ring 16 is fitted over and around the polygonal portion 30 or the hex head 32 and axially rests on and abuts the washer or flange 52. A biasing means such a spring, which may be a coil spring 56, is fitted over and around the polygonal portion 30 or the hex head 32. The coil spring 56 axially rests on and abuts the ratchet ring 16. The coil spring 56 may be conical as illustrated in FIGS. 1-3. An annular retaining ring 58 is fitted over and around the polygonal portion 30 or the hex head 32 and axially rests on, compresses, and abuts the coil spring 56. The annular retaining ring 58 is snapped into and received in an annular groove 60 in the body 12 which may be above the polygonal portion 30 or the hex head 32. The annular retaining ring 58 axially secures the coil spring 56 and the ratchet ring 16 to the self-locking plug 10 above the washer or flange 52 when the retaining ring 58 is snapped into the annular groove 60.

The hooks 31 extend sufficiently downward to engage the notches 36 in the upper wall 76 when the externally threaded top portion 92 of the shank 90 begins to engage the internally threaded upper port opening 94 of the upper borescope port 72 to prevent rotation of the ratchet ring 16 during threading in of the plug 10 and ratcheting. As the threading and attendant ratcheting continues, the ratchet ring 16 moves up but does not rotate relative to the upper wall 76. When the threading and attendant ratcheting is finished, the fingers 22 of the ratchet ring 16 secure the plug 10 from rotating by engaging the polygonal sides 28 of the polygonal portion 30 of the body 12 such as a hex head 32 illustrated in FIG. 4.

Figure 8:
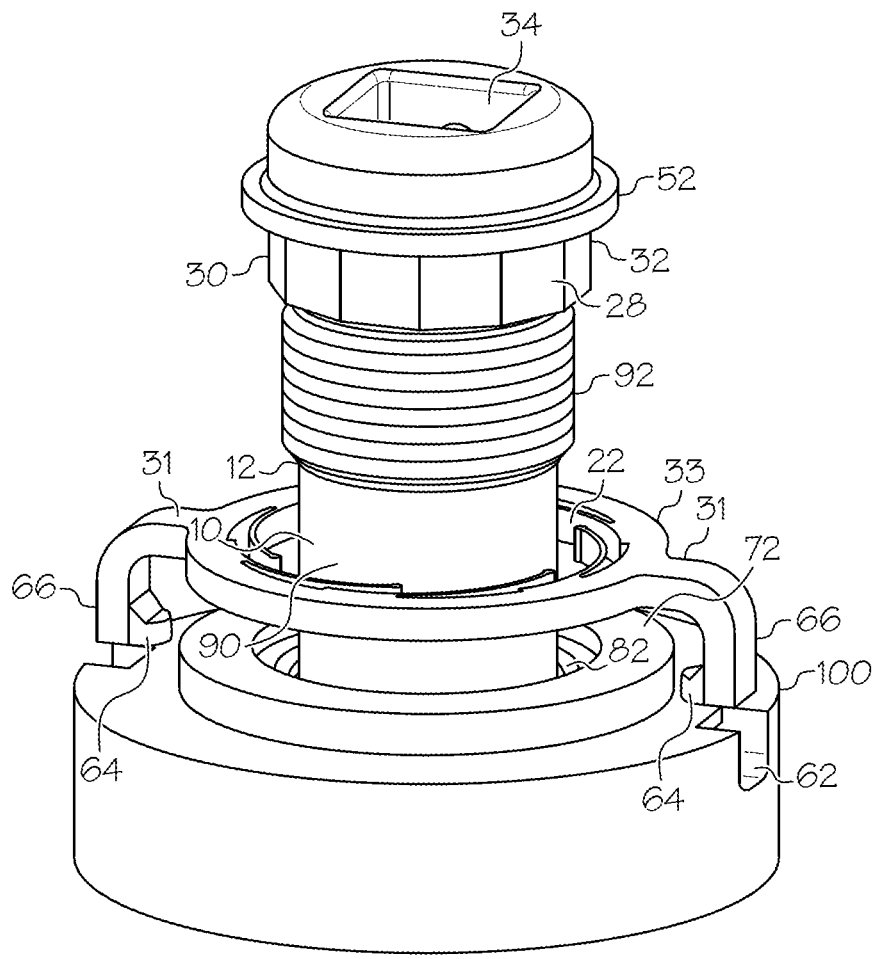
FIG. 8 is a diagrammatical perspective view illustration of an alternative embodiment of the assembly illustrated in FIG. 3 with a ratchet ring carrying the fingers and mounted to a casing.
Figure 9:
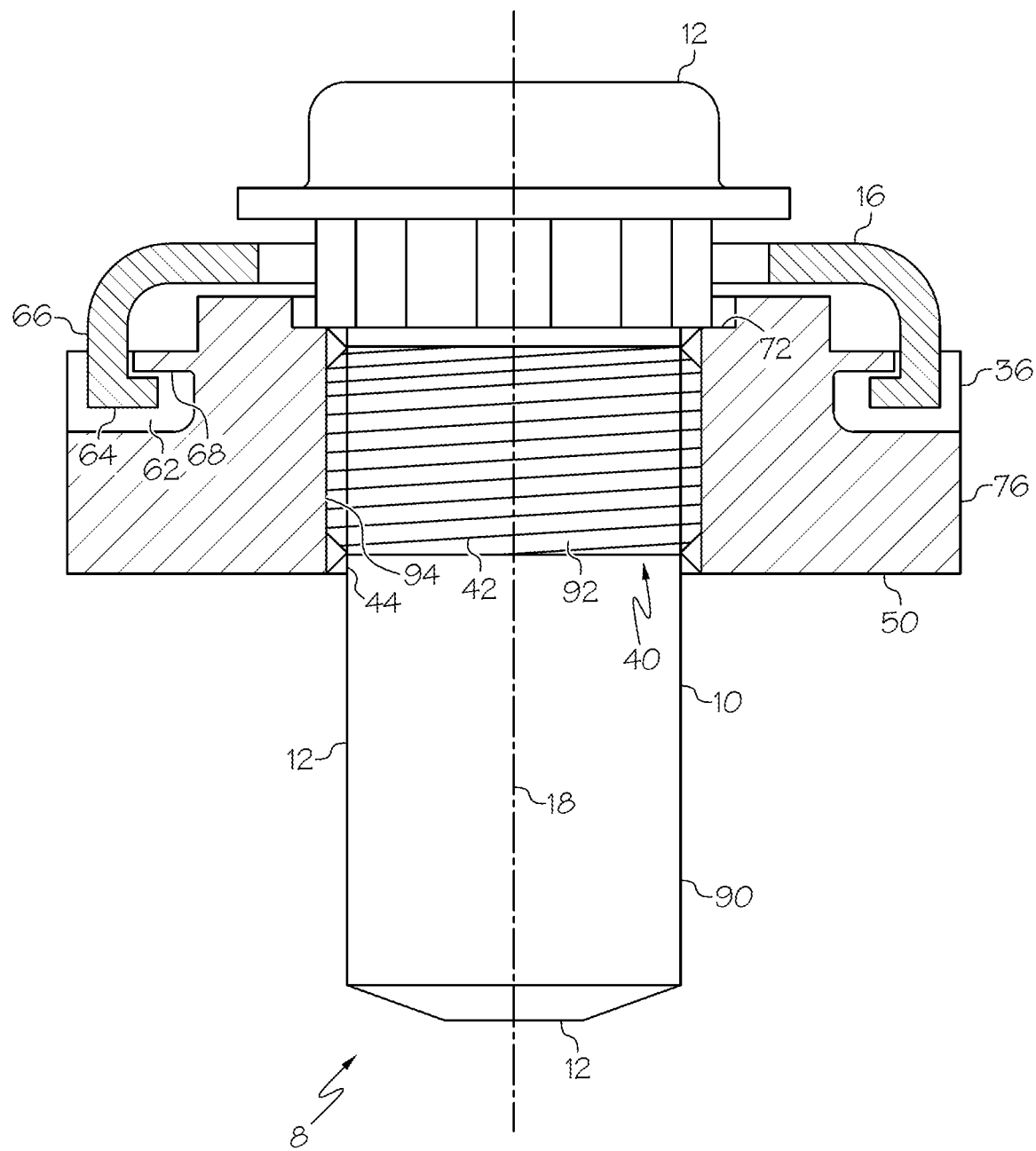
FIG. 9 is a diagrammatical cross-sectional view illustration of the alternative embodiment of the assembly illustrated in FIG. 3.

Illustrated in FIGS. 8 and 9 is an alternative embodiment of the self-locking plug assembly 8 and provides alternative embodiments of the ratchet ring 16, the hooks 31, and notches 36. The alternative embodiment also eliminates the coil spring 56, the annular retaining ring 58, and the annular groove 60 in the body 12. The ratchet ring 16 is mounted to the upper borescope port 72 or upper wall 76. Pockets 62 extend radially inwardly toward the centerline 18 and into the upper borescope port 72 or upper wall 76. The hooks 31 extend outwardly and downwardly from a periphery 33 of the ratchet ring 16 to engage the pockets 62 to prevent rotation of the ratchet ring 16 during threading in of the plug 10 and ratcheting. Paws 64 extend radially inwardly from downwardly extending legs 66 of the hooks 31 and into the pockets 62. The paws 64 engage upper pocket walls 68 of the pockets 62 to axially secure the ratchet ring 16.

It will be appreciated that the assembly 8 is not limited by the intended use as a borescope plug, and that such an assembly may be used in other applications, such as a drain plug, an access plug, a chip detector, and other similar threaded parts including bolts. The borescope plug 10 illustrated herein is used to seal upper and lower borescope ports 72, 74 in upper and lower walls 76, 78, respectively.

Illustrated in FIGS. 10-13 is another exemplary embodiment of a self-locking plug assembly 8. It will be appreciated that the assembly 8 has many applications such as a borescope plug, a drain plug, an access plug, a chip detector, and other similar threaded parts including bolts. The assembly 8 includes the self-locking plug 10, or other threaded article. A body 12 of the plug 10 is a body or revolution circumscribed about a longitudinal centerline 18. The assembly 8 and plug 10 further includes a ratchet ring 16 circumscribed about the centerline 18 and the body 12 of the self-locking plug 10, or other threaded article.

Figure 10:
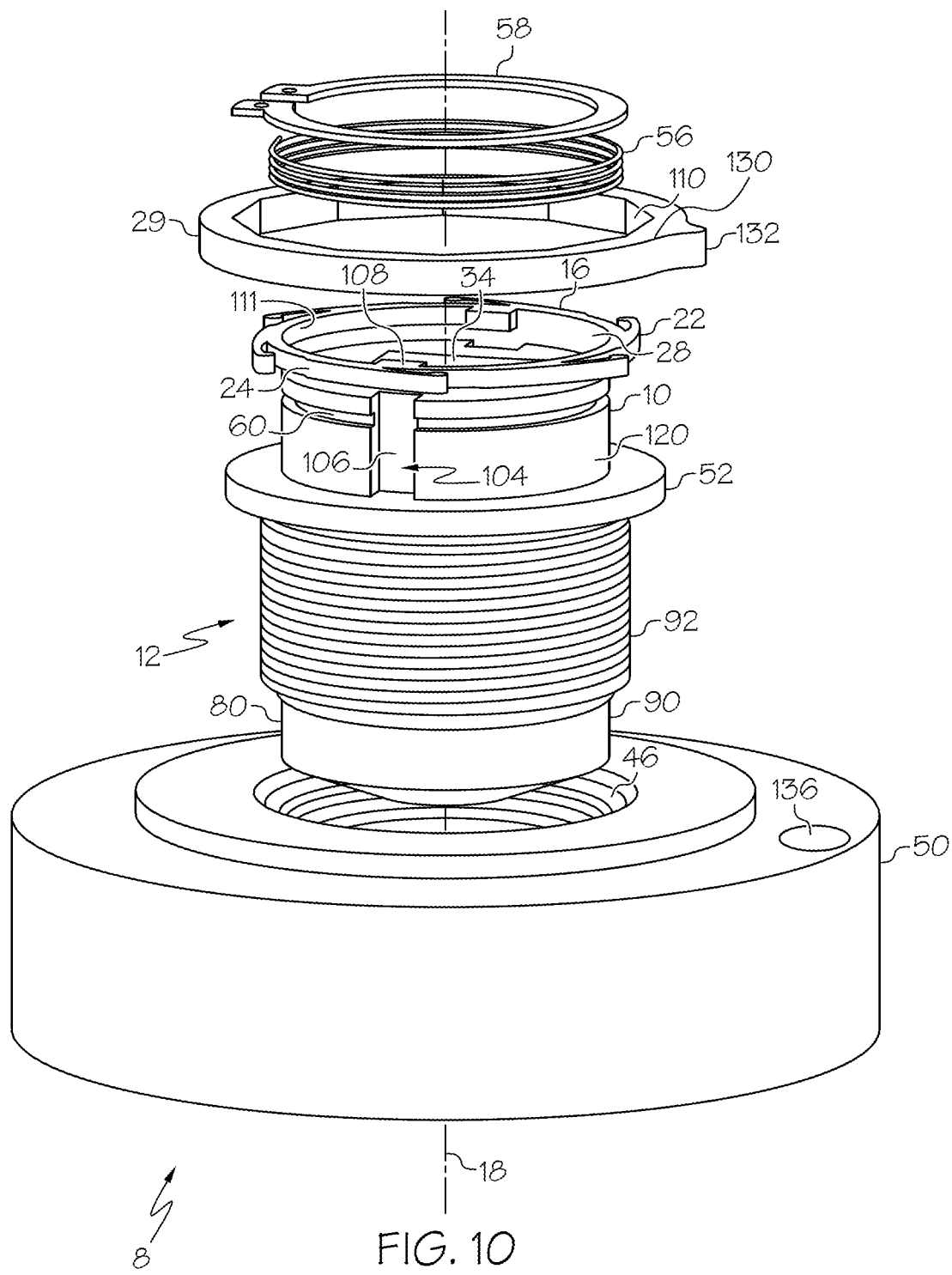
FIG. 10 is an exploded diagrammatical perspective view illustration of another exemplary embodiment of the assembly with the elastic fingers extending radially inwardly from a ratchet ring to engage the polygonal sides on an inner polygonal sided ring attached to the body.
Figure 13:
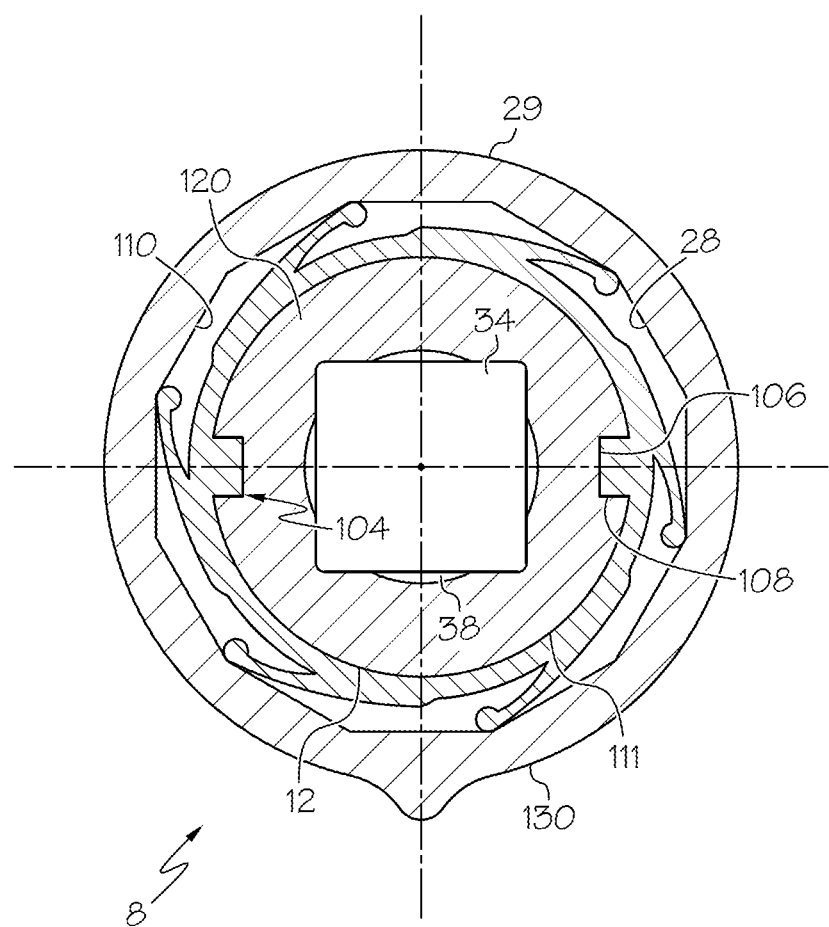
FIG. 13 is a cross-sectional diagrammatical view illustration of the assembly through 13-13 in FIG. 12.

The ratchet ring 16 includes flexible fingers 22 extending or spiraling radially outwardly from a radially outer rim 24 of the ratchet ring 16. The fingers 22 engage polygonal sides 28 of a multi-faceted inner side 110 of a polygonal sided ring 29 circumscribing the ratchet ring 16 during ratcheting as illustrated in FIG. 13. The assembly 8 further includes an anti-rotation means 104 for preventing the ratchet ring 16 from rotating about the body 12. An exemplary embodiment of the anti-rotation means 104, illustrated in FIGS. 10 and 13 is a key in a key groove including at least one and preferably two tracks 106 and rails 108. The tracks 106 (key grooves) are disposed and run axially along the body 12 and the rails 108 (keys) are disposed along a radially inner surface 111 of the ratchet ring 16. This allows the ratchet ring 16 to slide axially along the body 12 while preventing the ratchet ring 16 from rotating about the body 12. The ratchet rings 16 may be designed with different numbers of fingers 22, six fingers 22 are illustrated in FIG. 13. At least one pin 132 extends outwardly and downwardly from a periphery 130 of the polygonal sided ring 29 to engage notches or pin holes 136 in an outer casing 50 to prevent rotation of the polygonal sided ring 29 during threading in of the plug 10 and ratcheting.

A shank 90 of the body 12 extends down from a washer or flange 52 around the body 12 and a top portion 92 of the shank 90 is externally threaded. The externally threaded top portion 92 is suitable to be threaded into an internally threaded port or hole 46 in the outer casing 50. Alternatively, the top portion 92 of the shank 90 may be internally threaded and the port or hole 46 may be externally threaded. Thus, the top portion 92 of the shank 90 and the port or hole 46 are reciprocally threaded. The lower end 80 of the body 12 may also be the lower end 80 the shank 90.

A drive element illustrated herein as a square recess 34 in a top end 120 of the self-locking plug 10 is used for receiving a square drive as may be found in a wrench socket set. Examples of other suitable drive elements include Allen socket, splined socket, an external hex, and the like. A dimple 38 is disposed in an inner surface inside of the square recess 34. The dimple 38 is used to secure the square drive socket. A washer or flange 52 is disposed between the top end 120 of the self-locking plug 10 and the externally threaded top portion 92 of shank 90 or alternatively another threaded portion 40 of the body 12.

Figure 11:
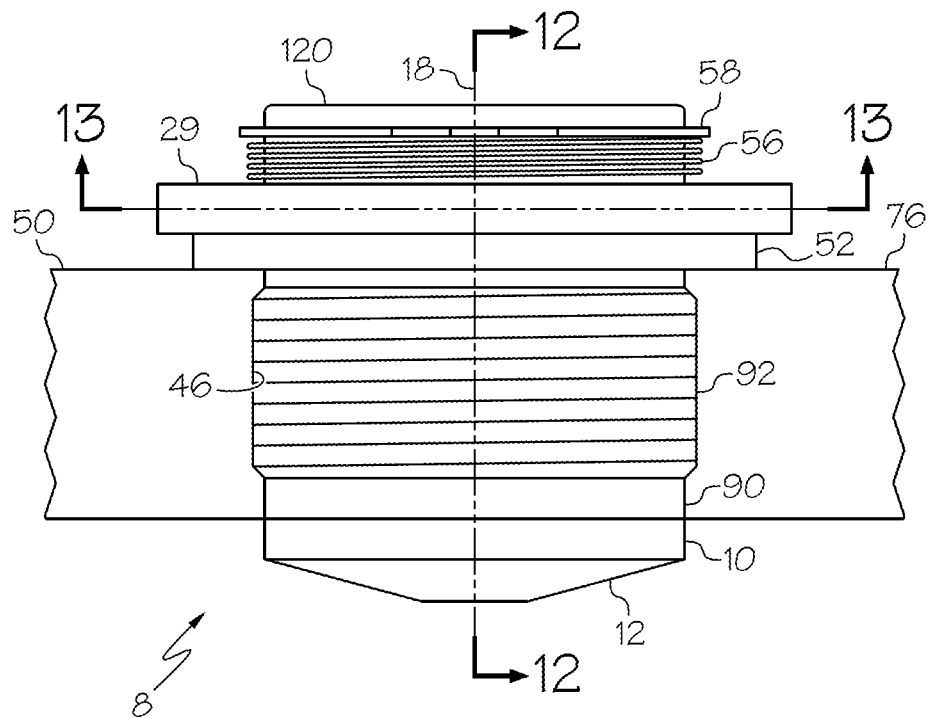
FIG. 11 is a side view illustration of the assembly illustrated in FIG. 10.
Figure 12:
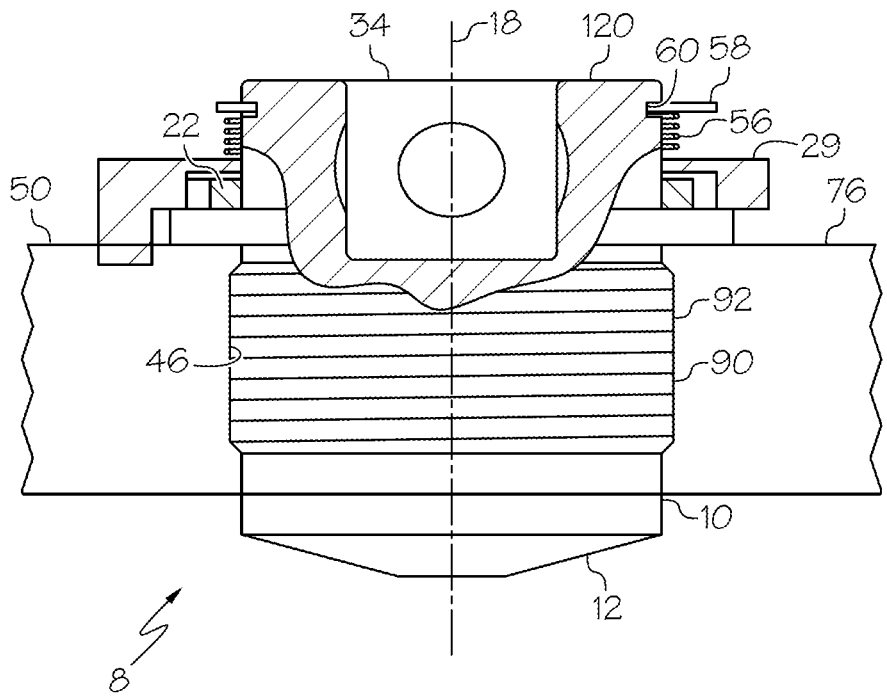
FIG. 12 is a cross-sectional diagrammatical view illustration of the assembly through 12-12 in FIG. 11.

The polygonal sided ring 29 and the ratchet ring 16 are fitted over and around the top end 120 of the self-locking plug 10 and axially rest on and abut the washer or flange 52. A biasing means such a spring, which may be a coil spring 56, is fitted over and around the top end 120 of the self-locking plug 10. The coil spring 56 axially rests on and abuts the polygonal sided ring 29. The coil spring 56 may be cylindrical as illustrated in FIGS. 10 and 11. An annular retaining ring 58 is fitted over and around the top end 120 of the self-locking plug 10 and axially rests on, compresses, and abuts the coil spring 56. The annular retaining ring 58 is snapped into and received in an annular groove 60 in the top end 120 of the self-locking plug 10. The annular retaining ring 58 axially secures the coil spring 56, the polygonal sided ring 29, and the ratchet ring 16 to the self-locking plug 10 above the washer or flange 52 when the retaining ring 58 is snapped into the annular groove 60.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed:

1. A self-locking plug assembly comprising:
   a body circumscribing a longitudinal centerline,
   a ratchet ring circumscribing the body,
   the body including a shank and at least a top portion of the shank being threaded, and
   the ratchet ring including flexible fingers extending or spiraling radially away from a periphery of the ratchet ring towards and engaging polygonal sides of the body or of a multi-faceted or polygonal sided ring attached to the body.

2. The assembly as claimed in claim 1, further comprising the flexible fingers extending or spiraling radially inwardly towards the centerline from a radially outer rim of the ratchet ring and the fingers engaging the polygonal sides of a multi-faceted or polygonal portion of the body.

3. The assembly as claimed in claim 2, further comprising hooks extending radially outwardly and downwardly from the periphery of the ratchet ring.

4. The assembly as claimed in claim 3, further comprising the hooks engaging notches in an upper wall to prevent rotation of the ratchet ring during threading in of the body.

5. The assembly as claimed in claim 4, further comprising:
   a spring or a coil spring over and around the polygonal portion and axially resting on the ratchet ring,
   an annular retaining ring over and around the polygonal portion and axially resting on and compressing the spring or coil spring, and
   the retaining ring snapped into and received in an annular groove in the body.

6. The assembly as claimed in claim 5, further comprising the annular groove above the polygonal portion.

7. The assembly as claimed in claim 3, further comprising paws extending radially inwardly from downwardly extending legs of the hooks.

8. The assembly as claimed in claim 7, further comprising:
   pockets extending radially inwardly toward the centerline and into an upper wall,
   the paws extending radially inwardly from the downwardly extending legs into the pockets, and
   the paws engaging upper pocket walls of the pockets to axially secure the ratchet ring and to prevent rotation of the ratchet ring during threading in of the body.

9. The assembly as claimed in claim 1, further comprising:
   the flexible fingers extending or spiraling radially outwardly away from the centerline from a radially outer rim of the ratchet ring,
   the fingers engaging the polygonal sides of a multi-faceted inner side of the polygonal sided ring circumscribing the ratchet ring, and
   an anti-rotation means for preventing the ratchet ring from rotating about the body.

10. The assembly as claimed in claim 9, further comprising a threaded port or hole in an outer casing reciprocally threaded with the threaded top portion of the shank and at least one pin extending outwardly and downwardly from a periphery of the polygonal sided ring and engaging notches or pin holes in the outer casing to prevent rotation of the polygonal sided ring during the threading.

11. The assembly as claimed in claim 10, further comprising:
    a spring fitted over and around a top end of the plug and axially resting on the polygonal sided ring,
    an annular retaining ring fitted over and around the top end of the plug and axially resting on and compressing the spring, and
    the retaining ring snapped into and received in an annular groove in the top end.

12. A self-locking plug assembly, comprising:
    a borescope plug for sealing at least one of upper and lower borescope ports in upper and lower walls, respectively,
    a body of the borescope plug circumscribing a longitudinal centerline,
    a ratchet ring circumscribing the body,
    the body including a shank and at least a top portion of the shank being threaded, and
    the ratchet ring including flexible fingers extending or spiraling radially away from a periphery of the ratchet ring towards and engaging polygonal sides of the body or of a multi-faceted or polygonal sided ring attached to the body.

13. The assembly as claimed in claim 12, further comprising:
    the flexible fingers extending or spiraling radially inwardly towards the centerline from a radially outer rim of the ratchet ring,
    the fingers engaging the polygonal sides of a multi-faceted or polygonal portion of the body,
    upper and lower port openings in the upper and lower borescope ports, respectively, and
    the threaded top portion of the shank and one of the upper and lower port openings being reciprocally threaded.

14. The assembly as claimed in claim 13, further comprising:
    hooks extending radially outwardly and downwardly from the periphery of the ratchet ring and engaging notches in at least one of the upper and lower borescope ports or in at least one of the upper and lower walls to prevent rotation of the ratchet ring during threading in of the body,
    a spring or a coil spring over and around the polygonal portion and axially resting on and abutting the ratchet ring,
    an annular retaining ring over and around the polygonal portion and axially resting on and compressing the spring or coil spring, and
    the retaining ring snapped into and received in an annular groove in the body above the polygonal portion.

15. The assembly as claimed in claim 14, further comprising:
    paws extending radially inwardly from downwardly extending legs of the hooks,
    pockets extending radially inwardly toward the centerline and into an upper wall,
    the paws extending radially inwardly from the downwardly extending legs into the pockets, and
    the paws engaging upper pocket walls of the pockets to axially secure the ratchet ring and to prevent rotation of the ratchet ring during threading in of the body.

16. The assembly as claimed in claim 12, further comprising:
    the flexible fingers extending or spiraling radially outwardly away from the centerline from a radially outer rim of the ratchet ring,
    the fingers engaging the polygonal sides of a multi-faceted inner side of a polygonal sided ring circumscribing the ratchet ring,
    the at least one of upper and lower borescope ports reciprocally threaded with the threaded top portion of the shank, and
    an anti-rotation means for preventing the ratchet ring from rotating about the body while threading the body into the threaded port or hole.

17. The assembly as claimed in claim 16, further comprising at least one pin extending outwardly and downwardly from a periphery of the polygonal sided ring and engaging pin holes in the outer casing to prevent rotation of the polygonal sided ring during the threading.

18. The assembly as claimed in claim 17, further comprising:
    a spring fitted over and around a top end of the plug and axially resting on the polygonal sided ring,
    an annular retaining ring fitted over and around the top end of the self-locking plug and axially resting on and compressing the spring, and
    the retaining ring snapped into and received in an annular groove in the top end.

19. A self-locking plug assembly, comprising:
a borescope plug for sealing upper and lower borescope ports in upper and lower walls, respectively,
a body circumscribing a longitudinal centerline,
a ratchet ring circumscribing the body,
the body including a shank,
at least a top portion of the shank being threaded,
the threaded top portion of the shank reciprocally threaded with an upper port opening of the upper borescope port,
a lower end of the shank sealingly engaged with a lower port opening of the lower borescope port, and
the ratchet ring including flexible fingers extending or spiraling radially away from a periphery of the ratchet ring towards and engaging polygonal sides of the body or of a multi-faceted or polygonal sided ring attached to the body.

20. The assembly as claimed in claim 19, further comprising the lower end conformally shaped to the lower port opening.

21. The assembly as claimed in claim 20, further comprising the lower end and the lower port opening conically shaped.

22. The assembly as claimed in claim 20, further comprising hooks extending radially outwardly and downwardly from the periphery of the ratchet ring and engaging notches in the upper borescope port or in the upper wall to prevent rotation of the ratchet ring during threading in of the body.

23. The assembly as claimed in claim 22, further comprising:
a spring or a coil spring over and around the polygonal portion and axially resting on and abutting the ratchet ring,
an annular retaining ring over and around the polygonal portion and axially resting on and abutting or compressing the spring or coil spring, and
the retaining ring snapped into and received in an annular groove in the body.

24. The assembly as claimed in claim 23, further comprising the annular groove above the polygonal portion.

25. The assembly as claimed in claim 24, further comprising:
hooks extending radially outwardly and downwardly from a periphery of the ratchet ring,
paws extending radially inwardly from downwardly extending legs of the hooks,
pockets extending radially inwardly toward the centerline and into the upper wall,
the paws extending radially inwardly from the downwardly extending legs into the pockets, and
the paws engaging upper pocket walls of the pockets to axially secure the ratchet ring and to prevent rotation of the ratchet ring during threading in of the body.

26. The assembly as claimed in claim 20, further comprising:
the flexible fingers extending or spiraling radially outwardly away from the centerline from a radially outer rim of the ratchet ring,
the fingers engaging the polygonal sides of a multi-faceted inner side of a polygonal sided ring circumscribing the ratchet ring, and
an anti-rotation means for preventing the ratchet ring from rotating about the body while threading the body into the threaded port or hole.

27. The assembly as claimed in claim 26, further comprising:
the anti-rotation means including at least one set of tracks or key grooves and rails or keys,
the tracks disposed and running axially along the body, and
the rails disposed along a radially inner surface of the ratchet ring.

28. The assembly as claimed in claim 26, further comprising at least one pin extending outwardly and downwardly from a periphery of the polygonal sided ring and engaging pin holes in the outer casing to prevent rotation of the polygonal sided ring during the threading.

29. The assembly as claimed in claim 28, further comprising:
a spring fitted over and around a top end of the plug and axially resting on the polygonal sided ring,
an annular retaining ring fitted over and around the top end of the self-locking plug and axially resting on and compressing the coil spring, and
the retaining ring snapped into and received in an annular groove in the top end.

* * * * *